United States Patent [19]

Beppu et al.

[11] Patent Number: 5,008,573
[45] Date of Patent: Apr. 16, 1991

[54] MAGNETIC DISK ENCLOSURE WITH DETACHABLE STATOR

[75] Inventors: Osamu Beppu, Odawara; Toshihiro Moribe, Chigasaki; Youjiro Tezuka, Hiratuka; Akira Chuma, Ashigarakami, all of Japan

[73] Assignee: Hitachi, Ltd., Tokyo, Japan

[21] Appl. No.: 482,807

[22] Filed: Feb. 21, 1990

[30] Foreign Application Priority Data

Feb. 22, 1989 [JP] Japan .................. 1-40231

[51] Int. Cl.$^5$ .................. H02K 29/00; H02K 21/22; G11B 33/00
[52] U.S. Cl. .................. 310/67 R; 310/89; 360/99.04; 360/99.08
[58] Field of Search .......... 310/67 R, 89, 268; 360/97.01, 97.03, 98.07, 99.03, 99.08, 99.04

[56] References Cited

U.S. PATENT DOCUMENTS

| | | | |
|---|---|---|---|
| 4,539,611 | 9/1985 | Sidhu et al. | 360/99.04 |
| 4,805,054 | 2/1989 | Kamoto et al. | 360/99.08 |
| 4,894,735 | 1/1990 | Takahashi et al. | 360/97.01 |

FOREIGN PATENT DOCUMENTS

| | | | |
|---|---|---|---|
| 51-49934 | 12/1976 | Japan . | |
| 56-83256 | 7/1981 | Japan . | |
| 183682 | 11/1982 | Japan | 360/98.07 |
| 171774 | 10/1983 | Japan | 360/97.03 |
| 62-60459 | 3/1987 | Japan . | |
| 62-212968 | 9/1987 | Japan . | |

OTHER PUBLICATIONS

"Airflow System for Disk Drive", IBM Tech. Disclosure Bulletin, vol. 29, No. 3, Aug. 86, pp. 1258–1261.

Primary Examiner—Steven L. Stephan
Assistant Examiner—D. L. Rebsch
Attorney, Agent, or Firm—Fay, Sharpe, Beall, Fagan, Minnich & McKee

[57] ABSTRACT

A motor for a disc drive unit is spatially separated from an enclosure housing the magnetic disks and read-write heads. The disks are mounted on a hub that is fixed to a shaft extending through the hub, having bearings at either end of the shaft. One end of the shaft extends outside of the enclosure, the rotor of the motor is fixed to this end of the shaft and is concentric therewith. The rotor has a rotor housing that is cup-shaped, with an opening facing away from the interior of the enclosure. Inwardly of the rotor housing is a stator mounted on a supporting member. The supporting member is detachably mounted to the enclosure for easy access to the stator. Further, a circuit board having control elements for the motor, including a Hall element mounted thereon, is provided on the supporting member for easy access to the circuit board. Each of the coils of the stator is divided into windings, and the controller for the motor switches the number of windings used so that more of the windings are used for each coil during start-up than during the running condition, when less work is needed.

15 Claims, 6 Drawing Sheets

MAGNETIC DISK ENCLOSURE WITH DETACHABLE STATOR

BACKGROUND OF THE INVENTION

The present invention relates to the structure of a motor and particularly, to a motor for use in a magnetic disk unit to rotate the magnetic disks at high speed, the mounting structure thereof, and the controlling method thereof.

As disclosed in Japanese Laid-Open Pat. No. 62-212968 or in HITACHI Review Vol. 37 (1988), No. 5 p.283 -p.290, the conventional magnetic disk unit is so constructed that a motor is directly mounted at an end of the shaft to which a magnetic disk is fixed and is driven to rotate it. This motor is of an outer-rotor type having a cup-shaped rotor, and the rotor is positioned so that its opening faces the side of the chamber (enclosure) where the disk is stored. In the portion covered by the rotor, a stator is installed, and the stator is fixed to the non-rotatable portion of the motor. A board having the hall element to detect the position of the rotor is provided on the non-rotatable portion of the motor.

Furthermore, as described in Japanese Utility Model Publication No.51-49934, a magnetic shielding board is provided between the motor and the magnetic disk in order to protect the magnetic disk from any effect caused by a leakage of the magnetic field from the motor.

SUMMARY OF THE INVENTION

In the structure of such a conventional motor as has been explained, the rotor is constructed to cover the stator of the motor. It is therefore necessary to dismount the rotor for the inspection of the stator for its maintenance. Also, in the brushless dc motor which uses the hall element, it is necessary to dismount both the rotor and the stator for the replacement of the hall element and the other elements because the board having the hall element is installed between the opening of the rotor and the fixed portion of the motor.

Furthermore, the fixed portion of the stator is constructed to contact the shaft through the bearings, which causes the vibrations generated during the switching time of the excitation current of each phase of the stator to be transferred to the shaft. Thus, the problem arises that the transferred vibrations allow the magnetic disk to vibrate. Also, the heat generated in the stator portion is easily transferred to the bearing case and the shaft, causing different temperatures to exist locally between the respective members so that the problem of thermal distortion arises. These problems are so important that they cannot be ignored because the design the magnetic disk unit has increasingly required a higher accuracy and finer density year after year.

The present invention is made in view of the above-mentioned situation, and the first object thereof is to provide a motor having the structure which allows an easier maintenance of the stator thereof.

The second object of the present invention is to provide the structure of a motor wherein the stator portion is easily.

The third object of the present invention is to provide a structure of a motor which prevents vibrations generated during the switching time of the excitation current of each phase of the stator of the motor from being transferred to directly to the shaft.

The fourth object of the present invention is to provide a magnetic disk unit wherein the leakage of the magnetic flux of the motor to the magnetic disk is prevented without use of any additional shielding board.

The fifth object of the present invention is to provide a magnetic disk unit wherein the distribution of temperatures is uniformly maintained within the housing which stores the magnetic disk.

To achieve the above-mentioned objects, a motor for driving the magnetic disk of a magnetic disk unit is particularly constructed in such a manner as is subsequently described.

The shaft of the motor of a driven body, such as a magnetic disk, is mounted directly or through another structural member to the body. The motor and the driven body are spatially separated by a partition member such as flange. The shaft penetrates this flange with, for example, a bearing, and a rotor housing is fixed to the end portion of the shaft extending to the side where the motor is constructed. The rotor housing is a cup-shaped circular member having a opening at the opposite side of, for example, the above-mentioned partition member. In this rotor housing, a magnet and a rotor against the magnet are arranged to generate a rotating field. The stator is, for example, mounted on a circular supporting member. The supporting member is detachably mounted on the flange so that the stator can be maintained by removing this supporting member form the flange. It, therefore, becomes unnecessary to dismount the rotor housing, resulting in an improved accessibility to the stator.

In the magnetic disk unit, the supporting member is fixed to an enclosure, i.e., a storing body which stores the magnetic disks and the mechanism for positioning the magnetic head as well as other components of the unit. In this way, the maintenance can be conducted without affecting the shaft portion. Thus, the accuracy required for mounting the shaft, the rotational balance and other considerations are well maintained. Also, by making the structure so arranged that the stator and the shaft are not allowed to contact each other, the heat generated by the driving current flowing through the windings of the stator is not transferred directly to the shaft. If this structure is applied to the magnetic disk unit, any heat transfer to the magnetic disk through the shaft can be prevented. Thus, the thermal distortion of the magnetic head with respect to the magnetic disk can be prevented. Furthermore, vibrations generated during the switching time of a driving current flowing through the windings of the stator can be prevented from being transferred to the shaft directly. If this means is applied to a magnetic disk unit, vibrations of the magnetic disk and magnetic head can be reduced remarkably.

The material of the rotor housing is, for example, a ferrous magnetic material. An opening is provided for the rotor housing in such a manner that it covers the stator portion, and the rotor housing is mounted on the shaft so that the opening of the rotor housing is positioned opposite the flange. In this way, any leakage of magnetic flux can be prevented from affecting the magnetic disk unit without installing a shielding board.

The supporting member is circular in its shape and is detachable from the flange on which it is mounted. Also, on the supporting member, a board can be mounted to detect the rotational position of a magnet by means of a detecting element such as a hall element which is installed on the board. Thus, the board can be dismounted by removing the supporting member from the rotor housing. As a result, the stator, including the detecting element and the coil, can be accessed and maintained with ease. This board is of circular shape, and is preferably less than semicircular. It is preferably arranged at a position in the direction opposite to the direction of the position of the magnetic head towards the shaft. Furthermore, on the supporting member, grooves or holes for radiating heat are provided, or a radiating board is mounted so that the heat generated in the motor can be radiated outside effectively.

In the stator windings of the motor, an intermediate tap or switch is provided in order to switch the number of the windings while the motor is in motion. In this way, the number of the windings is made greater when the switch is actuated to provide a greater torque for starting the motor, and the number of coils is made less to rotate it at a high speed of, for example, 4,500 r.p.m. or more.

DESCRIPTION OF THE PREFERRED EMBODIMENTS

Figure 1:
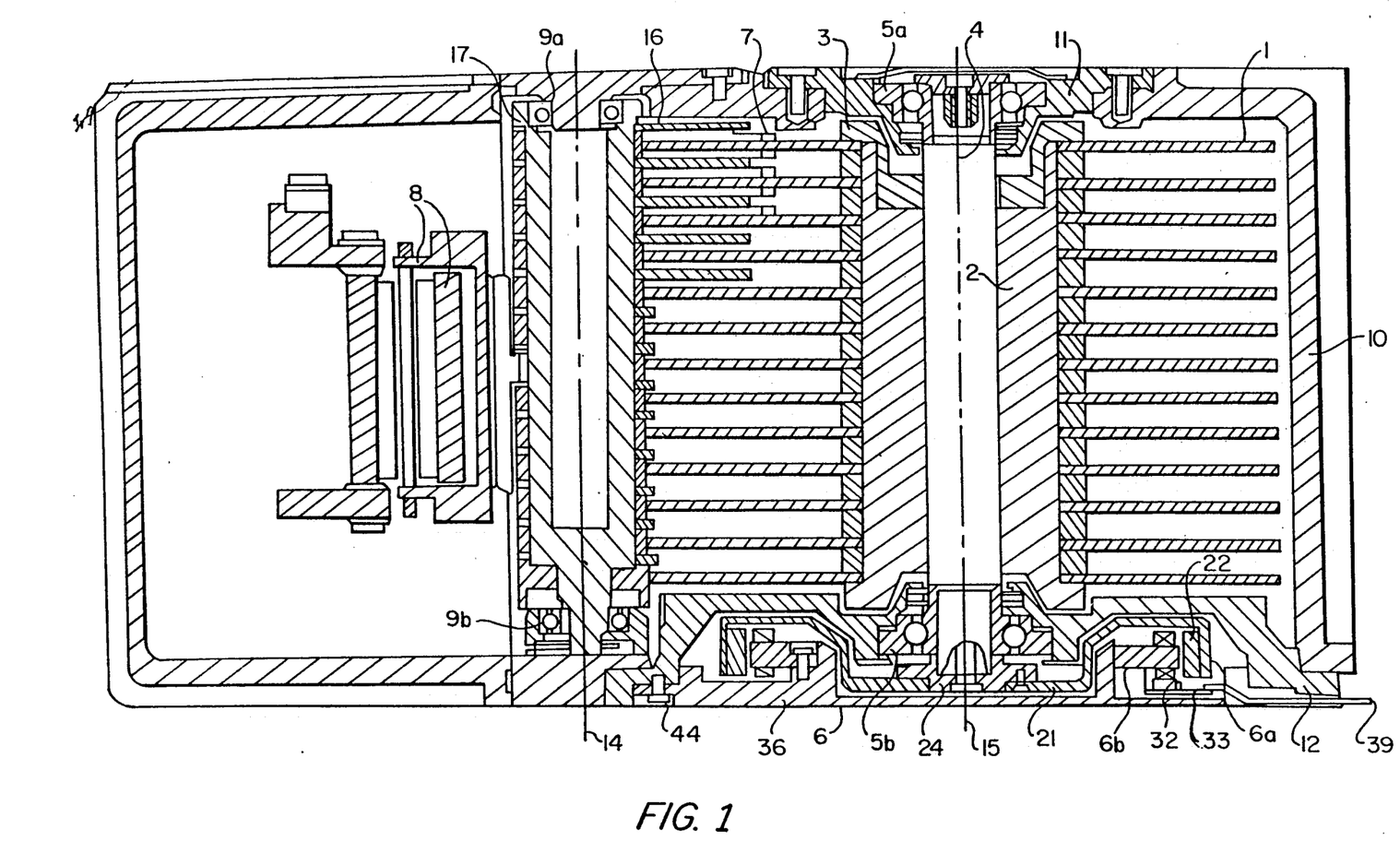
FIG. 1 is a sectional view of a magnetic disk unit embodying the present invention.
Figure 2:
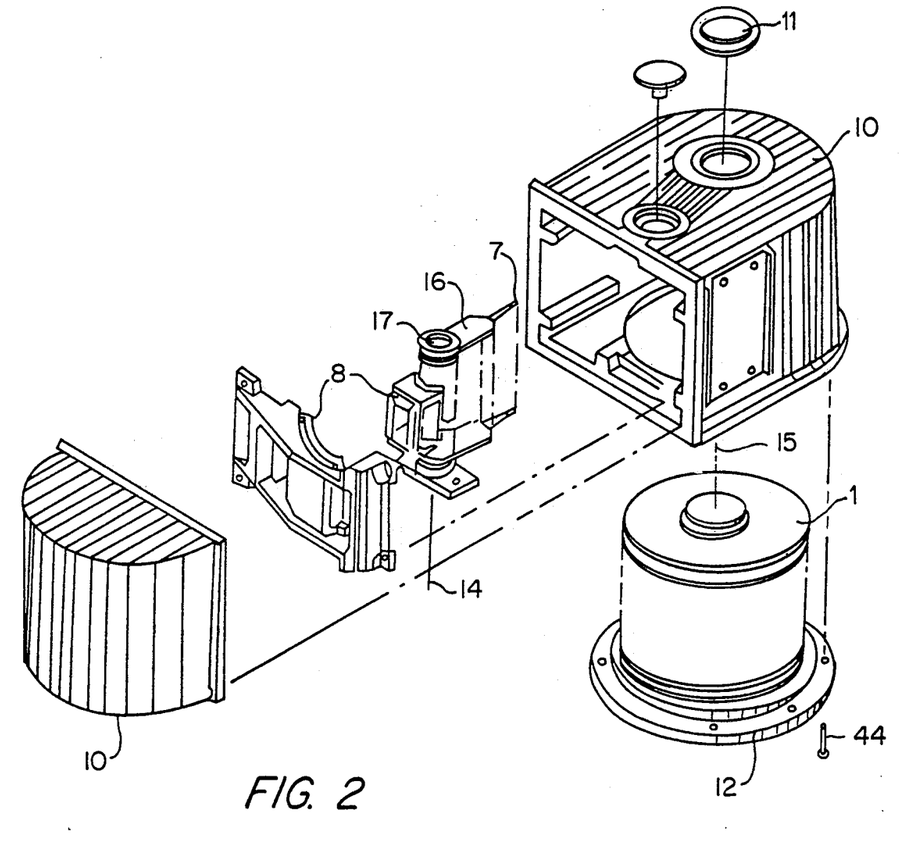
FIG. 2 is an exploded view in perspective of the magnetic disk unit of this embodiment.

FIG. 1 is a sectional view of a magnetic disk unit embodying the present invention. FIG. 2 is a perspective illustration thereof. The same reference numbers are used for the same parts.

A magnetic disk 1 is usually manufactured by forming a magnetic film on an aluminum substrate by sputtering or the like. Thirteen magnetic disks 1 are mounted on a spindle hub 2, and are fixed by a clamp 3. A shaft 4 extends through the spindle hub 2, and both ends thereof are fixed to bearing cases 11, 12 through bearings 5a, 5b. The bearing cases 11, 12 are fixed to an enclosure 10. The enclosure 10 contains, in addition to the assembly body of the magnetic disks, a magnetic head 7 which will be described later, and a mechanism for positioning the magnetic head which includes a voice coil motor 8 to drive it. Usually, the enclosure 10 encloses the components inside completely airtight, or semi-airtight with a small vent being provided.

In order to read information from and write information to the magnetic disks 1, a plurality of magnetic heads 7 are fixed to a head arm 16. At the other end of this head arm 16, a shaft 17 is fixed. The voice coil motor 8 is fixed to the shaft 17 at the side opposite to the head arm 16. With this voice coil motor 8, the magnetic head 7 is driven in the radial direction of the magnetic disks. Both ends of the shaft 17 are fixed to the enclosure 10 with the bearings 9a, 9b. At the side of one end, namely the lower end of the shaft 4, a motor 6 is mounted to rotate the magnetic disks 1. The motor 6 contains a rotor 6a and a stator 6b. The rotor 6a is fixed to the shaft 4. On the other hand, the stator 6b is fixed to a circular supporting member 36. In this supporting member 36, a board 33 is mounted in order to provide such a position detecting element 32 as a hall element. The supporting member 36 is fixed to the bearing case 12 by a screw 44. The bearing case 12 and the supporting member 36 are preferably made of aluminum.

Next, the structure of the motor 6 shown in FIG. 1 will be described in greater detail with reference to FIG. 3, which is a perspective illustration of the motor 6 shown in FIG. 1.

The motor 6 contains the rotor 6a fixed to the shaft 4. The stator 6b is fixed to the supporting member 36. The rotor housing 21 is preferably fabricated from a punched ferrous magnetic material and is fixed to the shaft 4 through a bushing 24 in such a manner that the opening of housing 21 faces the supporting member 36. Although rotor housing 21 is shown fixed to the bushing 24 by the screws 25 through mounting holes 23, it may be fixed to the shaft 4 by means of bonding, shrinkage fitting or some other methods. The rotor housing 21 is of a cup shape, and in this embodiment, the portion where it is fixed to the shaft 4 is depressed towards the stator side in order to make the thickness of the motor as thin as possible. In this depressed portion 18, the bearing 5b is arranged as shown in FIG. 1 to help improve the density in the mounting of the components. Inside the rotor housing 21, a cylindrical permanent magnet, namely magnet 22 is mounted. Permanent magnet 22 is evenly magnetically divided into several parts along the circumferential direction.

The stator 6b has a laminated construction of punched mild steel plates with twenty-four slots 28 and magnetic poles 29 arranged on the outer circumference thereof. Each magnetic pole is formed with a coil 30 mounted thereon. A board 33 having a rotational position detecting element 32 is provided, and is supported on stand pins 31. To the board 33, the terminal 301 of the coil 30 is connected, and three rotational position detecting hall elements 32 are arranged each at intervals of 30° angular displacement. Furthermore eleven pieces of pads 38 for drawing out lead lines are arranged. Board 33 is preferably made as small as possible in order to provide a space for installing fins 46. Lead lines 39 are drawn out from the pads 38 and connected to the driving circuit of the motor.

The stator 6b is fixed to the supporting member 36 by screws 37 through mounting holes 34 each arranged at three different places. This assembly of the stator 6b and the supporting member 36 is fixed to the enclosed case 10 by screws 44 through mounting holes 43. Consequently, even when the coil 30 is disconnected or the rotational position detecting element 32 is damaged, the assembly of the stator 6b and the supporting member 36 can easily be dismounted from the bearing case 12 by unscrewing the screws 44.

Now, one other point which can readily be understood from FIG. 1 is that there is a space between the bottom end of the shaft 4 and the supporting member 36 so that they are not in contact with each other. As a result, the transfer of vibrations and heat generated in the stator 6b to the shaft 4 can be diminished remarkably.

Also, it is noticeable that as shown in FIG. 1, the lead lines 39 are arranged in such a manner that they are drawn out to the opposite side of the magnetic head 7 against the axis 15 of the shaft 4. By arranging the lead lines 39 in the furthermost location from the head 7, the effect produced on the recording and reproduction of the magnetic head 7 by the magnetic noise transmitted from the lead lines 39 when the current is supplied to the motor can be diminished.

Figure 3:
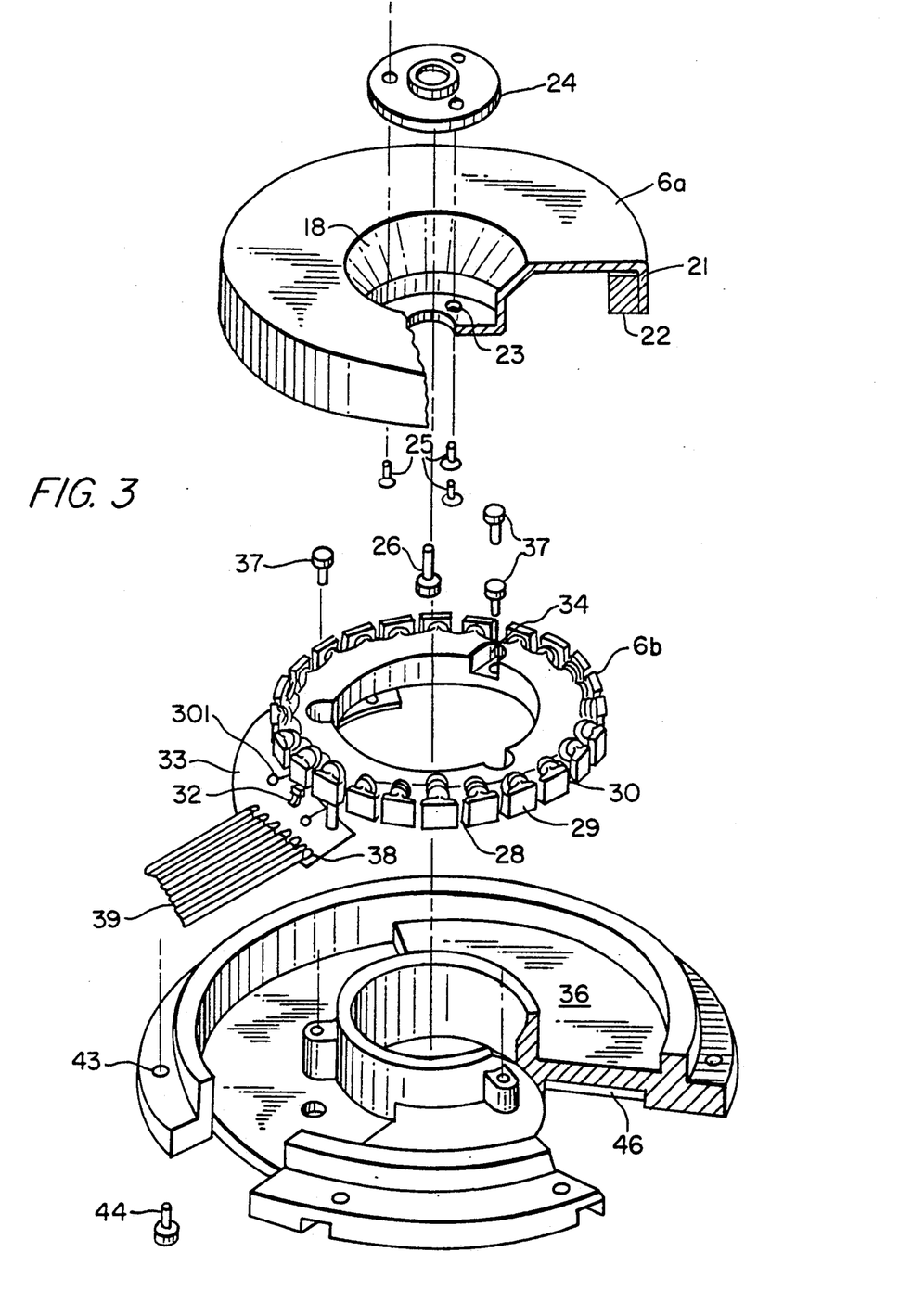
FIG. 3 is an exploded view in perspective illustrating the details of the motor shown in FIG. 1.
Figure 4:
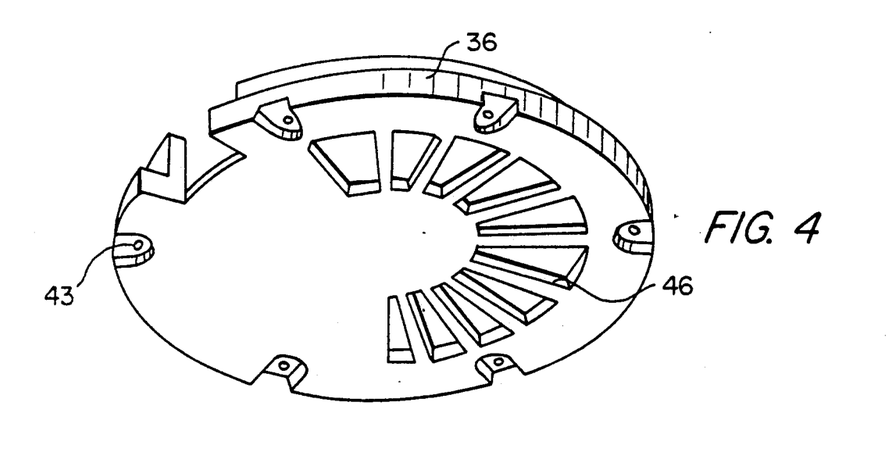
FIG. 4 is a perspective bottom view of the supporting member shown in FIG. 3.

FIG. 4 is a perspective illustration from the bottom of the supporting member 36 shown in FIG. 3. On the bottom face of the portion identical to the axis of the location where the board 33 is arranged, fins 46 are radially provided to radiate effectively the heat generated by the stator 6b so as to minimize heat conduction to the bearing case 12.

Generally, a magnetic disk unit as shown in FIG. 1 is extremely sturdy because of the shaft 4, the ends of which are both fixed in the enclosure 10. Thus, the magnetic disks 1 can be made with high precision for high speed revolution. However, when the motor 6 is mounted at the side of one end of the shaft 4, the heat generated by the motor 6 causes the temperature distribution within the enclosure 10 to be uneven so that the parallel relationship between axes 14 and 15 of shafts 17 and 4 respectively is disturbed. As a result, thermal distortion tends to take place. According to this embodiment, the heat from the coil 30 of the motor 6 is not transferred and is effectively radiated through the supporting member 36 so as to maintain the temperature distribution within the enclosure 10 almost even.

Figure 5:
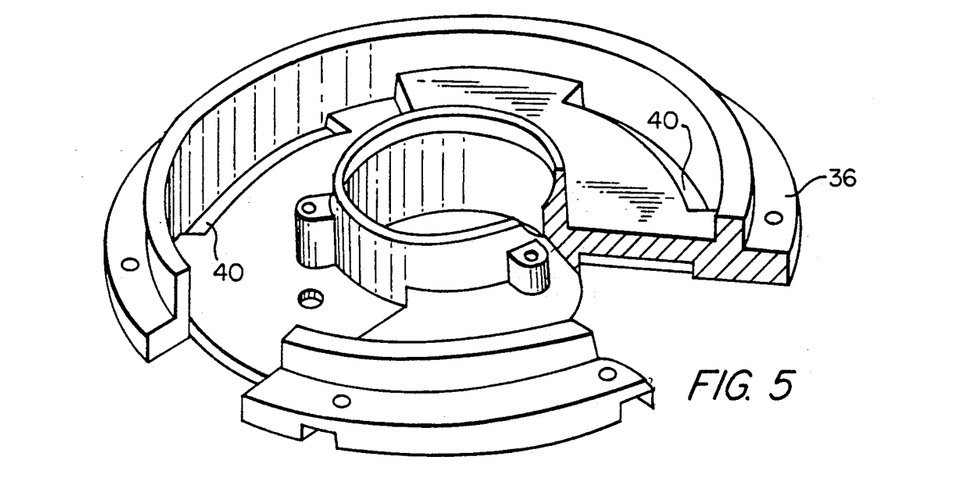
FIG. 5 is a perspective illustration of a variation of the supporting member.

FIG. 5 illustrates another embodiment of the supporting member 36. It has an opening 40 in order to improve the radiating effect. In this way, the heat generated within the motor 6 can be radiated effectively.

Figure 6:
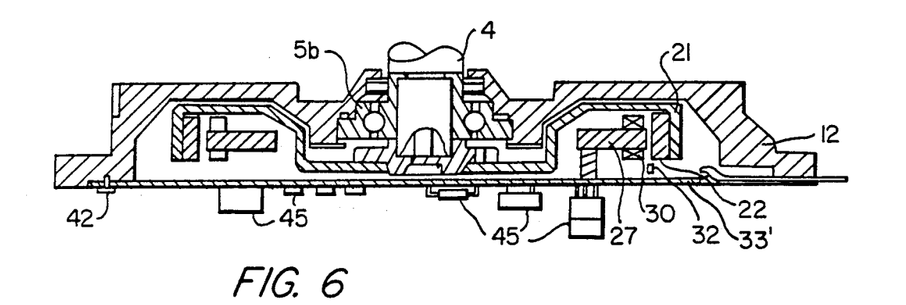
FIG. 6 is a sectional view illustrating the motor of the present invention according to another embodiment.
Figure 7:
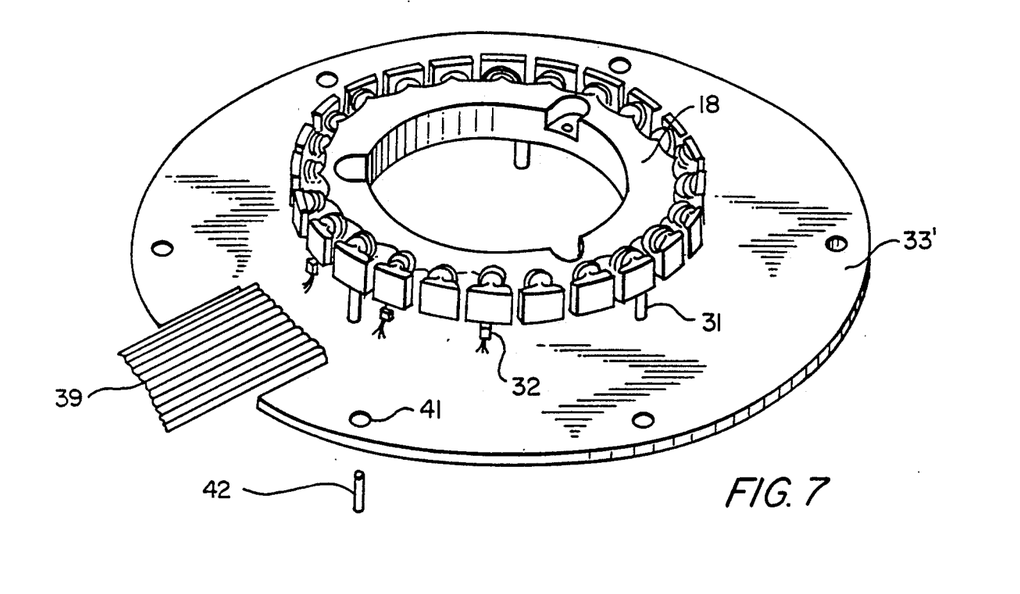
FIG. 7 is a perspective illustration of the stator portion shown in FIG. 6.

In FIG. 6 and FIG. 7, another embodiment of the magnetic disk unit is illustrated. The figures are respectively a sectional view of a motor (FIG. 6) and a perspective illustration of a stator 6b(FIG. 7). The stator 6b is mounted on a board 33' through stand pins 31. The board 33' is a circular circuit board and is mounted in such a manner that it is arranged beneath the shaft 4 by screws 42 through mounting holes 41 on the bearing case 12 which functions as a flange. On the upper face of the board 33', i.e. the surface where the stator 6b is arranged, the rotational position detecting element 32 of the stator 6b is mounted, and on the reverse side thereof, driving circuit components 45 comprising resistors, transistors, IC's and others are installed. As part of the driving circuit components 45, a circuit to adjust the revolution of the motor 6, a circuit to drive the motor 6b and others can be included.

Usually, a magnetic disk unit of the 3.5 to 8 inch size has 1 or 2 sheets of circuit boards outside the enclosure 10, and on the circuit board, the driving circuit components 45 are installed. This circuit board contains a controlling circuit for the magnetic head and an interface circuit. Therefore, it is difficult to replace only the driving circuit components 45 for the motor. According to this embodiment, the driving circuit components 45 are installed on the reverse side of the board 33'. As a result, even if either one of the coil 30, the rotational position detecting element 32, or the driving circuit component 45 breaks down, the repairing can easily be conducted by replacing only the assembly consisting of the stator 6b, the board 33' and the driving circuit components 45 as shown in FIG. 7.

Next, the controlling circuit of the motor 6 will be described. In recent years, because of the increasing numbers of stacked magnetic disks and the employment of the contact-start-stop (CSS) method, the starting torque required to start the motor has increased. Furthermore, the magnetic disk of late is the so-called sputter disk which is formed by sputtering a magnetic substance. The head has more adhesion to it as compared with the conventional disk, which is formed by coating so the sputter disk requires a much greater starting torque. These requirements of greater starting torque and increased r.p.m. may be adjusted by regulating the intensity of the magnetic field generated by increasing or decreasing the number of windings of the stator of the motor. However, it is difficult to manufacture a motor which can satisfy both of these requirements simultaneously, because their values are inverse to each other. The motor of this embodiment, therefore, controls itself by switching the numbers of the windings of the stator as shown in FIGS. 8 to 11.

Figure 8:
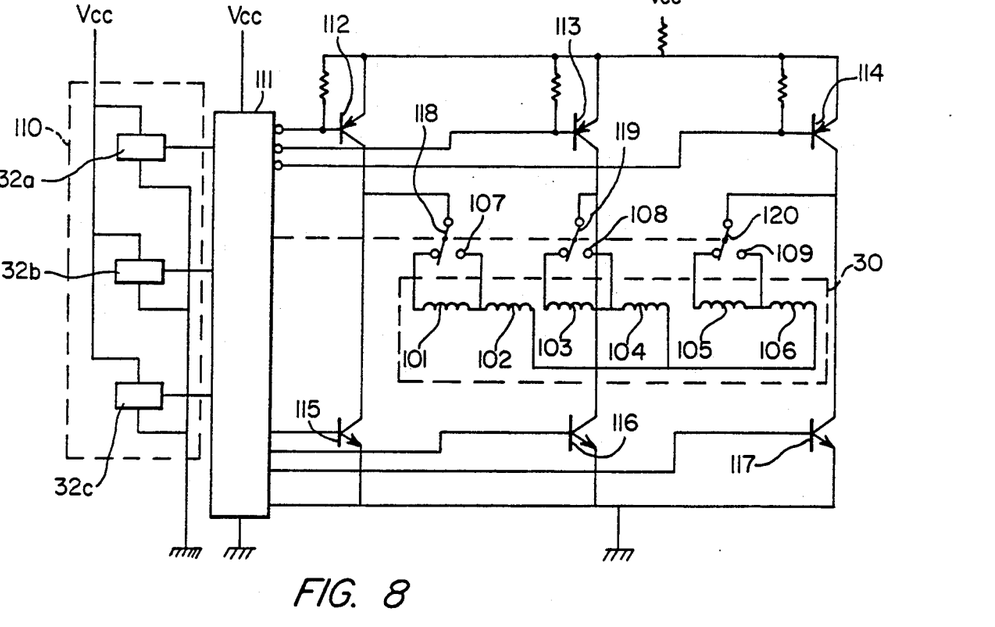
FIG. 8 is a diagram showing the driving circuit of the motor.

In FIG. 8, the coil 30 has 3-phase Y connection and the lead lines 107, 108, 109 are arranged between the coil lines 101 -102, 103 -104, and 105 -106 respectively. The number of windings of the coil lines 101, 103, 105 is L1 and that of 102, 104, 106 is L2, and the entire number of windings of each phase L1 +L2 is L.

Figure 9:
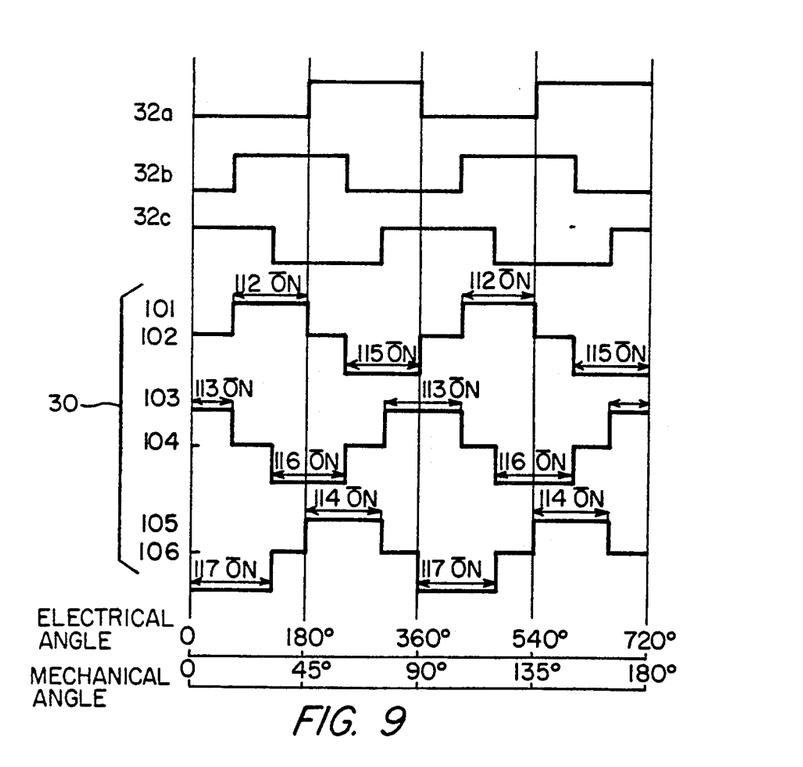
FIG. 9 is a chart showing the excitation timing of the coil shown in FIG. 7.

FIG. 9 is a chart showing the timing used to switch and magnetize the coil by position detecting signals and transistors. By the signals from the position detecting elements 32a, 32b, 33c in the rotational position detecting circuit 110, which are accepted as the switching times respectively, the transistors 112 -117 cycle on-off through the circuit 111 which determines the sequence of charging of the coil. Thus, the coil 30 is selectively excited in the normal or reverse direction. After starting the motor, switches 118 -120 provided in the front stage of the coil 30 are switched on in the process to a constant revolution. During the period of starting, the entire windings 101 -106 are used while lines 102, 104, 106, i.e. a part of the coil 30, are selectively switched on during the period of the constant revolution.

Figure 10:
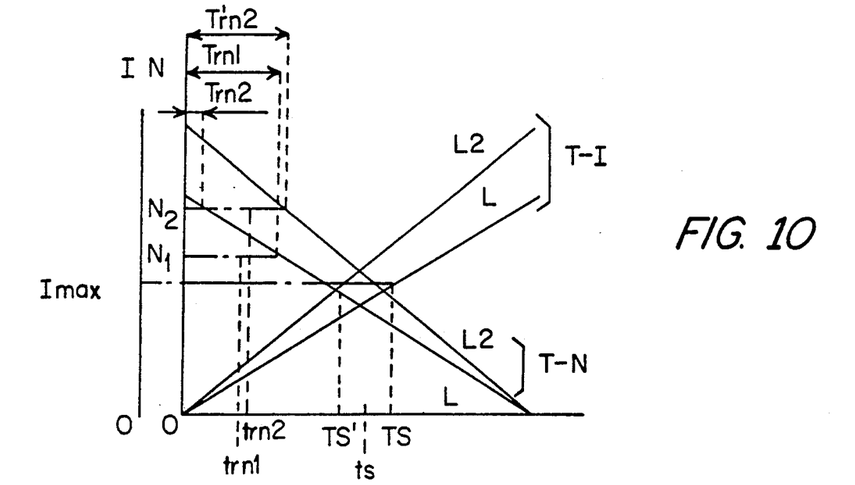
FIG. 10 is a diagram showing the torque characteristic of the motor of the invention.

FIG. 10 is a diagram showing the torque characteristic of the motor 6 embodying the present invention. The generated torque T of the motor 6 is increased in proportion to the current I and is decreased in proportion to the number of the revolution N. At this junction, the two different kinds of curved lines T-I and T-N shown in the diagram are obtained depending on the cases where the entire windings of the motor 6 (region of L number windings) are used and the local region of L2 number windings is used. In the diagram, $I_{max}$ represents the maximum allowable current during the period of starting the motor 6, Ts represents the starting torque, and $Tr_N$, the generated torque at the time of revolution N. Also, ts is the torque required for starting the rotation of the magnetic disk 1 against the friction and adhesion existing between the magnetic disk 1 and magnetic head 7, and the static torque of the bearings 5a, 5b, and $tr_N$ is the torque required to keep the constant revolution (N number of revolution) with the wind loss, the bearing friction and the adhesive resistance taken into consideration. In the case where the region of number L2 windings is locally used, each sign is given the prime (').

If a high speed revolution N2 (=5,000 rpm) is contemplated at L number of windings for the revolution N1 (=3,600 rpm) of the conventional disk 1, the required torque for such a high speed revolution is from $tr_{N1}$ to $tr_{N2}$. However, since the counter electromotive force of the coil is increased, the generated torque $Tr_{N2}$ at the time of N2 becomes $Tr_{N2} < tr_{N2}$, and it does not reach the torque at the revolution N2. If, on the contrary, the number of windings is decreased to L2 due to the lowered counter electromotive force at the time of high speed revolution, the starting torque against the maximum allowable current $I_{max}$ at the starting time decreased from Ts to Ts', and as it becomes Ts'<ts, the starting cannot take place. However, according to this embodiment, the entire region of L number of windings is used at the starting time and in the process of reaching the constant revolution, the switching to the local use of the region of L2 number windings is conducted. Thus, it becomes possible to contemplate a high speed revolution while securing the starting torque Ts, yet satisfying the required torque $tr_{N2}$.

Figure 11:
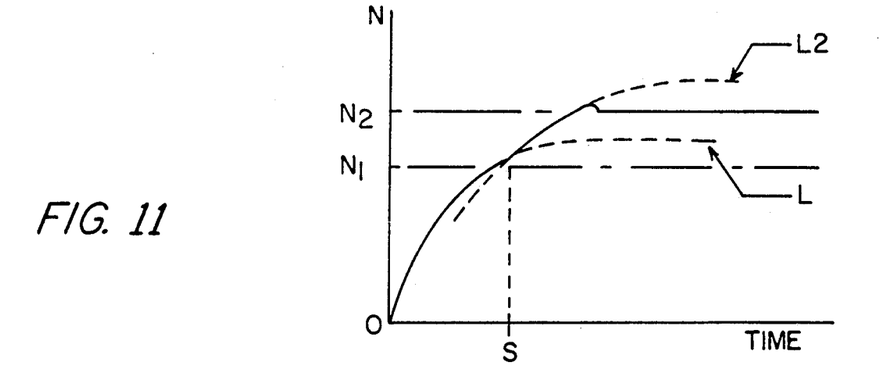
FIG. 11 is a diagram showing the step characteristic of the revolution of the motor of the invention.

FIG. 11 is a diagram showing the curved lines of the revolution step of a motor 6 embodying the present invention. The region in which the coil is used for the motor 6 started at the region of L windings is switched to the L2 region at the time s, and the constant revolution control takes place at the time it has reached the revolution N2. Thus, the curved line of the revolution step shown in solid line is obtained.

In this explanation, a motor having 3-phase Y-connection is described as an example. However, the number of phases and the method of connection are not limited only to those having been described. The same effect can be obtained for a motor, for example, with 4 phases or one having Δ-connection if only the motor is provided with a variable switching-on region. Also, a finer torque characteristic can be attained by setting the point of withdrawal in each phase of the coil in plural.

Figure 12:
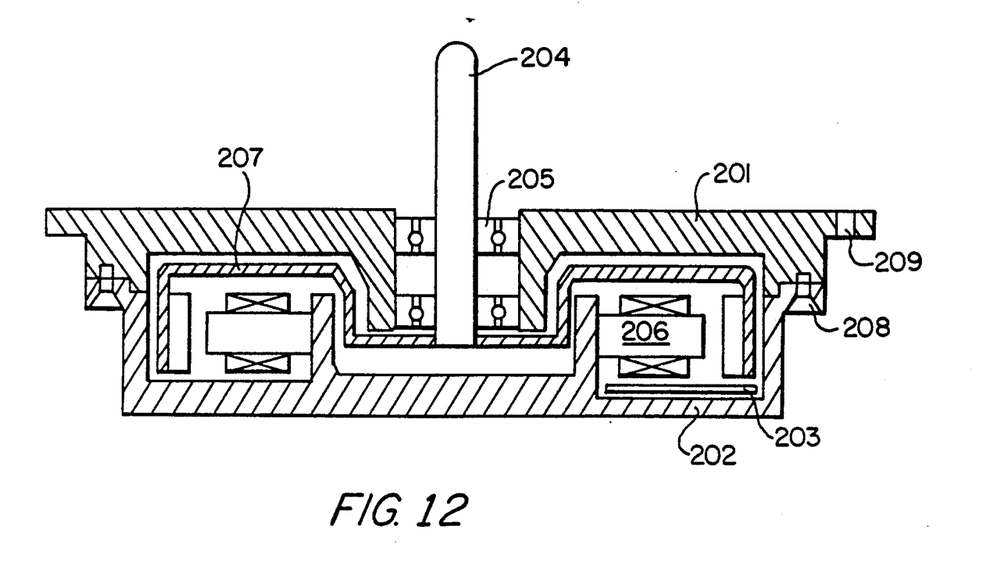
FIG. 12 is a sectional view of another motor embodying the present invention.

As set forth above, the structure of a motor for use in a magnetic disk unit and the controlling method thereof have been described with reference to FIGS. 1 to 11. The motor embodying the present invention is not limited to the use as mentioned above. It can be used for various purposes such as for driving a blowing fan, a laser disk unit and others. FIG. 12 is a sectional view of the motor illustrating on of such examples.

A flange 201I supports a shaft 204 rotatably through bearings 205. The flange 201 is, for example a circular member which is fixed, for example to the frame of a driven body by screws through a plurality of threaded holes 209 arranged on the surface of the circumference. A member 202 supports the stator 206. This supporting member 202 is removably mounted on the flange 201 by screws 208. At the top end of the shaft 204, the rotor 207 is fixed and at the other end thereof, a driven body is fixed. This rotor 207 is arranged in such a manner that the opening faces the supporting member 202. The stator 206 is fixed to the supporting member 202 in such a manner as to face the rotor 207 at a predetermined distance therefrom. On the supporting member 202, a board 203 is provided, on which such a rotational position detecting element (not shown) such as a hall element is mounted. The other structures of the motor of this embodiment are basically the same as those described with reference to FIG. 3, and here, therefore, the descriptions thereof are omitted.

This motor has an effect that the removal and mounting operation of the stator is extremely easy. Also, if the flange 201 and the supporting member 202 are connected through an elastic member such as rubber or the like, the transfer of the vibrations generated at the switching-on time of the driving current for the stator to the flange 201 can be remarkably reduced.

We claim:

1. A magnetic disk unit including at least one magnetic disk, comprising:
   a hub;
   means for supporting said hub in rotation, said magnetic disk being fixed to said hub;
   a magnetic head for reading/writing information from and to said magnetic disk;
   an actuator for positioning said magnetic head in predetermined positions on said magnetic disk;
   enclosure means having an interior portion for storing said magnetic disk, said magnetic head and said actuator;
   said means for supporting said hub in rotation including a shaft extending through said hub having bearings at its opposite ends for supporting said shaft in rotation with respect to said enclosure means;
   a motor for rotating said hub including said motor having a rotor concentrically mounted to said shaft having a rotor housing in the shape of a cup with an opening facing away from the interior portion of said enclosure;
   said rotor housing having a magnet fixed to the rotor housing and facing inwardly thereof;
   a stator mounted concentrically inwardly of said rotor, and facing said rotor magnet;
   one end of said shaft extending outside of said enclosure means and said rotor housing being fixed to said one end so that said rotor is positioned outside of said enclosure means; and
   a supporting member for supporting said stator and being fixed to said enclosure means adjacent said rotor such that said one end of said shaft and said supporting member are not in contact with one another.

2. A magnetic disk unit according to claim 1, wherein said rotor housing is made of a ferrous magnetic material.

3. A magnetic disk unit according to claim 1, wherein said rotor housing has a centrally depressed portion fixed to said one end of said shaft to minimize a dimension of said rotor housing in a longitudinal direction of said shaft.

4. A magnetic disk unit according to claim 1, further including detachable mounting means for detachably mounting said supporting member to said enclosure means.

5. A magnetic disk unit according to claim 4, further comprising a circuit board mounted on said supporting member and having an element mounted thereon for detecting a rotational position of said rotor with respect to said stator.

6. A magnetic disk unit according to claim 5, further comprising means for supplying current to said stator and lead lines extending therefrom and connected to said circuit board to provide current to said stator, said lead lines being arranged to extend from said stator to said current supplying means in a direction opposite said magnetic read/write head with respect to said shaft for minimizing electrical interference with said magnetic read/write head.

7. A magnetic disk unit according to claim 4, wherein said supporting member has fins for radiating heat.

8. A magnetic disk unit according to claim 4, wherein said supporting member has a vent for radiating heat.

9. A magnetic disk unit according to claim 1, wherein said stator further comprises:
   laminated steel plates having a plurality of slots; and
   coils formed by winding copper wire between said slots, each of said coils having a plurality of windings and means for activating selected ones of said plurality in accordance with a rotational speed of said rotor.

10. A magnetic disk unit, comprising:
   means for supporting a magnetic disk in rotation;
   transducer means for reading and writing information from and to said magnetic disk;
   means for positioning said transducer means at predetermined positions along said magnetic disk;
   means for enclosing said magnetic disk, said supporting means, said transducer means, and said positioning means;
   said rotation supporting means including a shaft having opposite ends mounted for rotation and bearings fixed to said enclosing means, wherein one end of said shaft extends outside of said enclosing means;
   a rotor having a rotor housing fixed to said one end of said shaft and concentric therewith, said rotor housing having a cup shape having an opening facing away from said enclosing means and a magnet mounted interiorly of the rotor housing;
   stator means positioned inwardly and concentrically adjacent said rotor housing such that said stator means faces said magnet of said rotor housing; and
   supporting member means for supporting said stator means, said supporting member means being detachably mounted to said enclosing means and said stator being fixed to only said supporting member means so that said stator is separated from said disk drive unit when said supporting member means is detached from said enclosing means.

11. A magnetic disk unit according to claim 10, wherein said supporting member means is circular in its shape such that it is concentric with said stator.

12. A magnetic disk unit according to claim 11, further comprising circuit board means positioned adjacent said stator for supporting thereon an element for detecting the rotational position of said rotor with respect to said stator.

13. A magnetic disk unit according to claim 12, wherein said circuit board means has a shape that is less than semicircular with respect to said stator.

14. A magnetic disk unit according to claim 13, wherein said circuit board means is circular in its shape.

15. A magnetic disk unit according to claim 15, further comprising a stator current controlling circuit for controlling the flow of current supplied to said stator said controlling circuit being mounted to said circuit board.

* * * * *